United States Patent [19]
Hintz

[11] Patent Number: 5,353,268
[45] Date of Patent: Oct. 4, 1994

[54] THERMOMAGNETIC RECORDING SYSTEM EMPLOYING A MEDIUM HAVING HIGH STORAGE DENSITY AND DIRECT-OVERWRITE CAPABILITY AS A RESULT OF ALONG-TRACK ISOCOERCIVITY

[75] Inventor: Michael B. Hintz, Mahtomedi, Minn.

[73] Assignee: Minnesota Mining and Manufacturing Company, St. Paul, Minn.

[21] Appl. No.: 150,771

[22] Filed: Nov. 12, 1993

Related U.S. Application Data

[63] Continuation of Ser. No. 566,048, Aug. 10, 1990, abandoned.

[51] Int. Cl.$^5$ .................. G11B 13/04; G11B 11/10; G11B 11/12
[52] U.S. Cl. .................. 369/13; 360/114; 360/59
[58] Field of Search .................. 369/13, 14; 360/59, 360/114; 365/122

[56] References Cited

U.S. PATENT DOCUMENTS

| | | | |
|---|---|---|---|
| 3,521,294 | 7/1970 | Treves | 346/74 |
| 3,546,675 | 12/1970 | Chung-Chow et al. | 340/174.1 |
| 3,562,760 | 2/1971 | Cushner et al. | 346/74 |
| 3,611,416 | 10/1971 | Wolf et al. | 346/74 |
| 3,626,114 | 12/1971 | Lewicki et al. | 179/100.2 |
| 4,340,914 | 7/1982 | Hanaoka | 360/59 |
| 4,363,052 | 12/1982 | Hanaoka | 360/59 |
| 4,404,247 | 9/1983 | Dominguez-Burguette et al. | 428/213 |
| 4,466,004 | 8/1984 | Kobayashi et al. | 346/74.4 |

(List continued on next page.)

FOREIGN PATENT DOCUMENTS

| | | | |
|---|---|---|---|
| 0291248A2 | 11/1988 | European Pat. Off. | G11B 11/10 |
| 390584 | 10/1990 | European Pat. Off. | G11B 5/127 |
| 0461907A2 | 12/1991 | European Pat. Off. | G11B 11/10 |
| 0470863A1 | 2/1992 | European Pat. Off. | G11B 11/10 |
| 0471527A2 | 2/1992 | European Pat. Off. | G11B 5/62 |

(List continued on next page.)

OTHER PUBLICATIONS

Journal of Applied Physics, vol. 63, No. 8, Apr. 1988, A. Kawamoto et al., "Corrsion-resistant-rare-earth-transition-metal amorphous films with high recording sensitivity for magneto-optical disks", pp. 3853–3855.

Journal of Applied Physics, vol. 63, No. 8, Apr. 1988, A. Kawamoto et al., "Compositional dependence of recording noise in amorphous rare-earth-transition-metal magneto-optical disks", pp. 3856–3858.

IBM Technical Disclosure Bulletin, vol. 32, No. 4A, Sep. 1989, IBM, "Thermomagnetic Recording Medium

(List continued on next page.)

Primary Examiner—Hoa T. Nguyen
Attorney, Agent, or Firm—Gary L. Griswold; Walter N. Kirn; Eric D. Levinson

[57] ABSTRACT

A thermomagnetic recording system achieves high areal bit density by combining the high linear bit density of magnetic recording and the high track density typical of magneto-optic recording. The system employs a medium which comprises a ferrimagnetic recording material having a compensation temperature approximately equal to ambient operating temperature, yet small coercivity and high saturation magnetization at elevated temperatures. A source of heat (preferably a laser) controls the magnetic properties of the material. Data is recorded and played back with high performance magnetic recording heads, producing direct overwrite capability, at temperatures less than the Curie point of the material.

24 Claims, 2 Drawing Sheets

U.S. PATENT DOCUMENTS

| | | | |
|---|---|---|---|
| 4,642,795 | 2/1987 | Tamada et al. | 365/10 |
| 4,680,742 | 7/1987 | Yamada | 369/14 |
| 4,694,358 | 9/1987 | Muschnik et al. | 360/59 |
| 4,707,755 | 11/1987 | Ohta et al. | 360/114 |
| 4,801,499 | 1/1989 | Aoyama et al. | 369/13 |
| 4,855,975 | 8/1989 | Akasaka et al. | 360/114 |
| 4,871,614 | 10/1989 | Kobayashi | 369/13 |
| 4,878,132 | 10/1989 | Aratani et al. | 360/114 |
| 4,882,718 | 11/1989 | Kryder et al. | 369/13 |
| 4,995,024 | 2/1991 | Arimune et al. | 369/13 |
| 5,051,970 | 9/1991 | Ishii et al. | 369/13 |

FOREIGN PATENT DOCUMENTS

| | | | |
|---|---|---|---|
| 3604642 | 5/1988 | Fed. Rep. of Germany | G11B 11/10 |
| 60-173745 | 9/1985 | Japan | 369/13 |
| 61-214258 | 9/1986 | Japan | 360/114 |
| 61-278060 | 12/1986 | Japan | 369/13 |
| 62-219203 | 9/1987 | Japan | . |
| 62-241154 | 10/1987 | Japan | 360/114 |

OTHER PUBLICATIONS for a Direct-Overwrite Recording System", pp. 384–386.

Japanese Journal Applied Physics, vol. 26, 1987, T. Nakao et al., "High speed overwritable magneto-optical recording", pp. 149–154.

Nakao et al., High Speed Overwritable Magneto-Optic Recording, Jap. J. Appl. Phys., vol. 26, Supp. 26-4, pp. 149–154, 1987.

Ojima et al., High Speed Overwritable Optical Disk, SPIE vol. 899, pp. 154–159, 1988.

Yamada et al., Pitshape at Overwriting of Thermal Magneto-Optical Recording, SPIE vol. 899, pp. 160–165, 1988.

THERMOMAGNETIC RECORDING SYSTEM EMPLOYING A MEDIUM HAVING HIGH STORAGE DENSITY AND DIRECT-OVERWRITE CAPABILITY AS A RESULT OF ALONG-TRACK ISOCOERCIVITY

This is a continuation of application Ser. No. 07/566,048 filed Aug. 10, 1990, now abandoned.

TECHNICAL FIELD

This invention relates to recording media which employ thermomagnetic recording materials to record data in a form which may be read, erased, or rewritten by magnetic equipment.

BACKGROUND

Digital magnetic recording media usually comprise a substrate in disk or tape form, and a thin layer of a magnetic-pigmented material or magnetic thin film material on the substrate. The magnetic material may exhibit magnetic anisotropy; i.e., it is energetically favorable for the magnetization vector to assume specific orientations relative to the plane of the magnetic layer. One common example is a medium having predominantly in-plane anisotropy, in which the "easy" (low energy) axes of magnetization lie within the plane. Another common example is a medium having perpendicular magnetic anisotropy, in which the easy axis of magnetization is substantially perpendicular to the plane. The remainder of this application assumes recording media having perpendicular anisotropy, but is applicable to media having other combinations of magnetic anisotropy unless specifically noted otherwise.

A small region of the material may have a magnetic moment directed in either of two directions (parallel and antiparallel) to the recording layer surface normal. The small region can represent the storage location of a single recorded digital data bit, and the two antiparallel directions of the magnetization represent binary values one and zero.

To record data, an external magnetic field is applied to the recording material by a magnetic recording head. (For the purposes of this discussion, only the field component applied by the head perpendicular to the recording medium is considered; also, demagnetization fields associated with the medium itself and the energy of magnetic domain walls are ignored.) The applied field component may be either parallel or antiparallel to the recording layer surface normal. If the coercivity of the material is less than the applied magnetic field, the magnetic moment of the material in the area will align with the direction of the field. The magnetic hysteresis of the material ensures that the bit area remains magnetized in that direction after the external field is removed. The magnetic moment of the bit area is determined by passing a magnetic transducer over the bit area, and sensing the fringe magnetic fields caused by the remanent magnetization. Typically, the magnetic transducer is an inductive playback head, but magneto-resistive or other types of transducers may be employed.

An alternative to magnetic recording is magneto-optic (MO) recording. Magneto-optic recording media usually comprise a substrate and several thin film layers deposited on the substrate. One or more of the thin film layers typically are amorphous rare earth-transition metal (RE-TM) alloy(s). The RE-TM alloy has magnetic anisotropy perpendicular to the plane of the thin film. A small region of the RE-TM alloy may have a magnetic moment directed in either of the two directions perpendicular to the plane of the thin film. The region can represent the storage location of a single recorded digital data bit, and the two perpendicular directions represent binary values one and zero. To read the binary value, the bit area is irradiated with a polarized laser beam. A change in the polarization direction of the reflected light caused by a combination of the Kerr and Faraday effects is detected, indicating the direction of the magnetic moment of the bit area.

To record data, an external magnetic field, often called a "bias"" field, is applied to the recording layer; the applied field is well below the ambient temperature coercivity of the recording layer, and so the applied field does not affect the magnetic alignment of the medium at ambient temperature. Concurrently, a focused laser beam pulse locally heats a bit area to a temperature close to or greater than the Curie or compensation temperature of the alloy. The magnetic coercivity of the RE-TM alloy in the heated bit area greatly decreases; following the laser pulse, the heated region cools back to ambient temperature. If the coercivity of the bit area falls below the magnitude of the external bias field at some time during the heating-cooling cycle, the magnetic moment of the alloy in the bit area aligns with the direction of the bias field. Upon return to ambient temperature, the coercivity of the material again becomes much greater than the applied bias field. The direction of the magnetic moment of the bit area will therefore remain the same as the direction of the external bias field direction during the heating-cooling cycle, even if the bias field direction changes at a later time after cooling, or the recording layer is exposed to relatively weak ambient magnetic fields. Thus, a bit is recorded with a particular binary value, corresponding to the bias field direction imposed during heating by the laser.

First generation magneto-optic recording media have somewhat higher areal storage density (the number of bits per unit of area on the physical recording volume (disk, tape, etc.)) than presently available magnetic storage media. Coincidentally, laboratory magnetic media have achieved storage densities similar to those of magneto-optic media. However, the two different types of media achieve this approximately equal areal density with different combinations of linear transition density (the number of magnetic transitions per unit length measured along a single recorded track) and track density (the number of tracks per unit length measured perpendicular to the track direction).

For magnetic recording, linear transition densities on the order of $2$–$6 \times 10^4$ transitions per centimeter and track densities on the order of $4$–$8 \times 10^2$ tracks per centimeter combine to produce an areal density of about $1$–$5 \times 10^7$ transitions per square centimeter. For magneto-optic recording, assuming a laser wavelength of about 830 nanometers, linear transition densities on the order of $6$–$12 \times 10^3$ transitions per centimeter and track densities on the order of $4$–$8 \times 10^3$ tracks per centimeter combine to produce an areal density of about $3$–$10 \times 10^7$ transitions per square centimeter. In magnetic recording, the linear transition density is limited by current head fabrication and head-to-medium spacing considerations, while the track density is limited by both head fabrication and currently achievable head positioning accuracy. In magneto-optic recording, both linear density and track density are limited by the size of the focused laser beam used to record and read data. For systems employing far-field optics (i.e., conventional lenses), the focused beam size is limited by diffraction to approximately the laser radiation wavelength. The minimum distance between transitions along a track is limited to roughly the beam diameter, while the minimum track spacing is typically limited to 1.5 to 2.0 times the beam diameter.

Magnetic recording offers direct overwrite capability, i.e., the ability to write a new bit directly onto the location of an existing bit, regardless of the former bit value, and without a requirement that the former bit be erased before the new bit may be written.

Early generation magneto-optic media did not have direct overwrite capability, but some recent designs do. In particular, a number of designs utilize laser power modulation, complicated medium structures, and additional magnetic fields to achieve direct overwrite capability.

An alternative method employs substantially a conventional M/O medium and some means for rapidly modulating the applied magnetic bias field, typically a magnetic head spaced from one to one thousand micrometers from the recording layer surface. While these techniques provide direct overwrite capability, they all employ conventional M/O readout of the recorded data. Thus, the playback resolution of these systems is subject to the same beam size resolution limitations as conventional optical recording.

DISCLOSURE OF INVENTION

The invention is a thermomagnetic recording medium for use with a heat source which raises temperature of a heated region of the medium above an ambient temperature to an operating temperature, a magnetic field source which imposes a magnetic field upon an area of the medium including at least a sub-portion of the heated region, and a magnetic field detector which senses remanent magnetic moment of the medium over a substantially rectangular sensing region having longest dimension normal to a track direction. The inventive medium comprises: a substrate, a barrier layer deposited on the substrate, a magnetizable recording layer deposited on the barrier layer, and a protective layer deposited on the recording layer. The magnetizable recording layer has net magnetic moment and coercivity dependent upon temperature, such that: the net magnetic moment is substantially zero at the ambient temperature and non-zero at the operating temperature; the coercivity decreases with temperature to zero at a Curie temperature which is substantially above the operating temperature; and the sub-portion of the heated region exposed to the imposed magnetic field exhibits substantially constant coercivity along the track direction. The invention also includes a recording system specifically adapted for use with the inventive medium.

DETAILED DESCRIPTION

Figure 1:
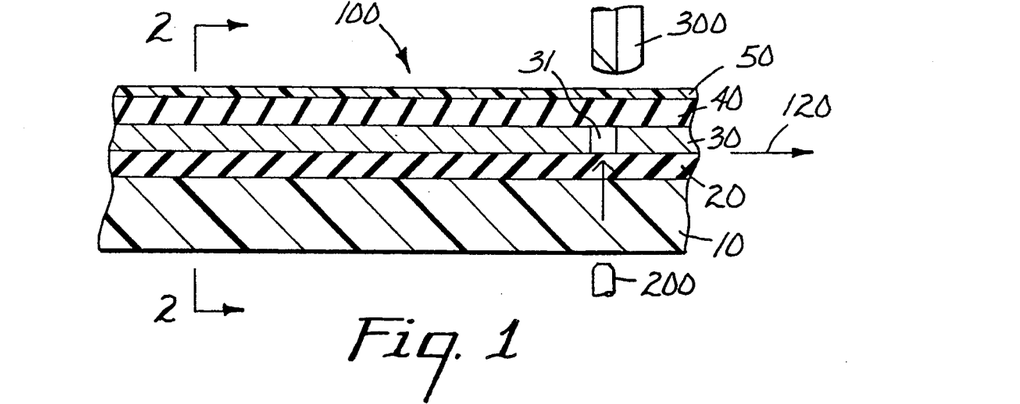
FIG. 1 is a schematic view of one embodiment of the invention.
Figure 2:
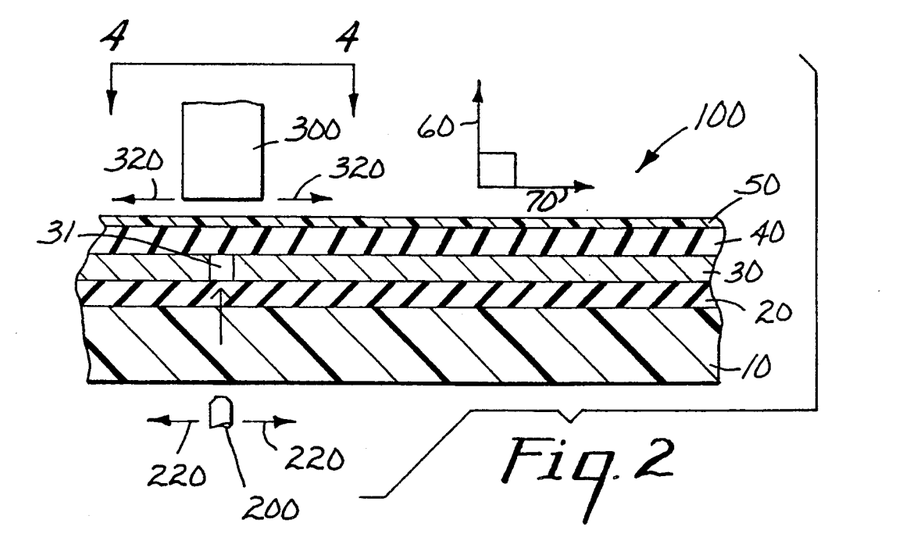
FIG. 2 is a schematic view taken along the line 2—2 of FIG. 1.

In the embodiment shown in FIGS. 1 and 2, the inventive thermomagnetic recording medium 100 is shown schematically in operation with a heat source 200 and a magnetic assembly 300. The recording medium 100 as shown comprises a substrate 10 and, deposited on the substrate, a barrier layer 20, a thin film data storage layer 30, and a protective layer 40.

Also shown is an optional lubricant layer 50, which is preferred when certain types of magnetic assembly 300 are employed, as described below. Furthermore, it may be desireable to include an additional thermal conduction control (TCC) layer (not shown) either between substrate 10 and barrier layer 20, or between barrier layer 20 and storage layer 30. The TCC layer can help the storage layer 30 perform as described below.

The substrate 10 is typically a dimensionally stable disc, but other configurations are possible, such as a flexible "floppy" disk, or tape. When a rigid disc is chosen, a typical thickness is 1.2 mm, and suitable materials include glass and polymers such as polymethylmethacrylate (PMMA) and polycarbonate (PC). For flexible substrates, polyethylene terapthalate (PET) and polyimides are suitable, with thicknesses dependent upon the intended application.

A barrier layer 20 is deposited on the substrate 10 beneath the storage layer 30. The barrier layer 20 protects the storage layer 30 from contaminants which may exist in, or penetrate through, the substrate 10. If a TCC layer is not employed, the barrier layer 20 may also provide control over the thermal conduction of energy provided by the heat source 200 to the storage layer 30. The protective layer 20 is typically from 5 to 200 nm thick.

Suitable materials for the barrier layer 20 are thin films of either stoichiometric or non-stoichiometric compounds containing silicon, oxygen, carbon, nitrogen, titanium, or other elements. Examples include silicon oxide, silicon suboxide, silicon carbide, silicon nitride, and other "dielectric" materials known in the art. The term "dielectric" as applied to these materials does not necessarily imply that the layers are electrical dielectrics, i.e., that they have very high electrical resistivities. The term "dielectric" merely indicates films that serve the same purposes as films which are known in the art as "dielectric" films.

The storage layer 30 has magnetic properties as a function of temperature which make it suitable for storing data in small regions such as a bit 31. For example, the net magnetic moment of the storage layer 30 is a strong function of temperature. A preferred material has substantially zero saturation magnetization at the ambient operating temperature ($T_a$) of the medium, which is typically from about 10 to 40 Celsius (about 280 to 320 Kelvin); one example is a ferrimagnetic material having a compensation temperature ($T_{comp}$) approximately equal to $T_a$, so that the vector sum of the magnetic subnetwork moments of the material is zero at ambient temperature.

Figure 3:
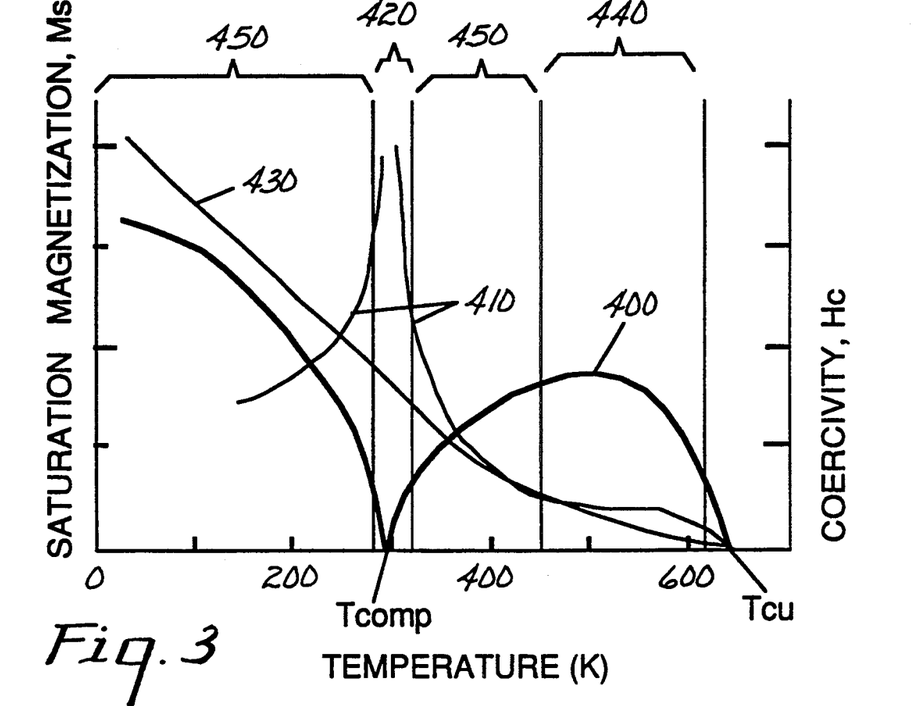
FIG. 3 is a graph showing the saturation magnetization, $M_s$, (on the left abscissa) and the coercivity, $H_c$, (on the right abscissa), each as a function of temperature, of the recording layer of FIGS. 1 and 2.

The magnetic properties of a preferred storage layer 30 are illustrated generally in the graph of FIG. 3. The material exhibits high coercivity (indicated by the narrow line 410) in the vicinity of ambient operating temperatures (indicated by the region 420); this is because the product of the magnetization, $M_s$, and the coercivity, $H_c$, in a ferrimagnetic material decreases with temperature as shown schematically by the dotted line 430. Because $H_c$ is inversely proportional to $M_s$, the magnetization (indicated by the thick line 400) is very low near the compensation temperature. However, at temperatures higher than ambient temperature, the magnetization 400 increases and the product $M_s*H_c$ decreases; thus, the coercivity 410 decreases.

Some thin films of amorphous magnetic alloys have the properties required for the storage layer 30. Suitable alloys include those of one or more of the rare earth metals (atomic numbers 57 to 71 inclusive), particularly terbium, gadolinium, and dysprosium; and one or more of the transition metals (atomic numbers 21–30, 39–48, and 71–80, inclusive), particularly cobalt, iron, manganese and nickel. One suitable alloy would have (by atomic weight of the total) about 0–25 percent terbium, about 0–25 percent dysprosium, about 0–50 percent iron, and about 10–70 percent cobalt.

Smaller amounts of other elements may be added to the alloy to improve its magnetic or materials properties, such as the addition of chromium, yttrium or tantalum to improve corrosion resistance of the alloy. The other elements need not be rare earths or transition metals.

Instead of a single layer of an RE-TM alloy, the storage layer 30 may also comprise multiple sub-layers of compositionally distinct RE, TM, RE-TM or other alloys magnetically coupled to one another at their common interface(s) by exchange interactions. Unless otherwise noted, the term "storage layer" can include a combination of sub-layers. This construction allows greater latitude in tailoring the magnetic properties of the storage layer, but involves additional manufacturing steps.

When rare earth-transition metal (RE-TM) alloys are used for storage layer 30, the layer is about 20 to 500 nm in thickness.

A protective layer 40 is deposited on the storage layer 30. The protective layer 40, like the barrier layer 20, protects the storage layer 30 from contaminants. Suitable materials are also thin films of either stoichiometric or non-stoichiometric compounds containing silicon, oxygen, carbon, nitrogen, titanium, or other elements. Examples include silicon oxide, silicon suboxide, silicon carbide, silicon nitride, and other materials known in the art. The material need not be the same as that used for the barrier layer. The protective layer 40 may range from 5 to 100 nm in thickness, although the thickness of this layer should be minimized to reduce "spacing loss" (i.e., a decrease in field intensity with increased distance between the storage layer 30 and the magnetic assembly 300) during recording and readout of data.

The heat source 200 may be any electromagnetic or thermal source of energy which is capable of heating, through the substrate 10 and the protective layer 20, localized areas 31 of the storage layer 30 to a temperature in the temperature range 440.

Additionally, but not shown for clarity, some means for accurately locating the heat source 200 is preferred. High accuracy optical methods are preferred, such as optically following tracks grooved in the substrate and servo-positioning the heat source 200. (The substrate may be grooved by embossing, injection molding, ion etching and the like as known in the art; alternatively, a separate grooved tracking layer (not shown) may be added to the substrate. For example, a hexanediol diacrylate tracking layer may be added to a PMMA substrate.)

Thus, the preferred heat source 200 is a focused laser beam, as the laser light may be used for both heating the medium and accurately locating the heat source at a particular location. A suitable laser wavelength is 830 nanometers, but shorter wavelengths are preferred as they lead to increased areal bit densities by reducing the diffraction limited dimensions of the focused laser beam. Use of a laser beam for the heat source 200 requires that the substrate 10 and the protective layer 20 be transparent at the wavelength of the laser light. A material is "transparent" for purposes of this discussion when a layer of the thickness used in the particular medium construction absorbs less than 20 percent of the light incident upon it. In general, the optical properties of the materials suitable for the "optical stack" (comprising the substrate 10, the barrier layer 20, the storage layer 30, and the protective layer 40 in the embodiment shown in FIGS. 1 and 2) are functions of light wavelength. Thus, the design of the optical stack varies with laser wavelength, but the principles are well known in the art. The optical stack design preferably promotes transmission of the laser light to the storage layer, thus requiring as little laser output power as possible to heat the storage layer 30.

The magnetic assembly 300 is shown in FIG. 1 as a high performance type inductive head which combines the functions of recording (writing), reproducing (reading), and erasing of data, such as that shown in U.S. Pat. No. 4,363,052 (Hanaoka). This depiction is schematic only; in general, magnetic assembly 300 is any device capable of detecting and changing remanent magnetic properties of the storage layer 30. In general, the magnetic assembly 300 will have a substantially rectangular sense area, with the larger dimension of the sense area substantially normal to the track direction. Also, other types of magnetic devices and/or multiple devices may be used for the two separate functions of detecting remanent magnetic properties of the medium (reading), and of changing magnetic properties of the medium (writing and erasing), in accordance with principles known in the art.. For example, magnetic assembly 300 could be comprised of a magnetoresistive device for detection. Furthermore, the design of the magnetic assembly 300 is affected by the choice of anisotropy direction in the storage layer 30. The head shown in FIG. 1 is suitable for perpendicular recording, but as noted earlier this is not required to use the present invention.

Additionally, although the magnetic assembly 300 and heat source 200 are shown on opposite sides of the medium in FIGS. 1 and 2, this is for clarity only, as both could operate on the same side of the recording medium. This could be accomplished by including within magnetic assembly 300 a waveguide to direct laser light to the medium surface in a magnetic transducer gap, a fiber optic assembly located inside or outside the gap, incorporation of a laser diode into a magnetic transducer assembly, or other constructions. Such an arrangement would allow a medium to have a non-transparent substrate, and/or be a two-sided medium in which either side comprises a single-sided medium as described above. Suitable modifications to the optical stack known in the art are required in the two-sided case—e.g., if the optical stack is inverted, interchanging the protective layer and barrier layer, appropriate modifications are required.

In many instances, application of an optional lubricant layer 50 may be preferred to minimize abrasion and wear. The lubricant layer may be any of the materials known in the art for this purpose, such as fatty acids and fatty acid esters, but preferably it is one of the polymerizable perfluoropolyether monomers taught in U.S. Pat. No. 4,404,247 (Dominguez-Burguette et al.). To allow the magnetic assembly 300 to be sufficiently close to recording medium 100 for optimal accuracy of recording and playback, the lubricant layer 50 should be not more than 20 nanometers thick., and preferably not more than 5 nanometers thick.

In operation, the medium 100 moves at relatively high velocity under the magnetic assembly 300, as indicated by the directional arrow 120. The heat source 200 and the magnetic assembly 300 may move laterally in direction 120, as indicated by directional arrows 220 and 320, respectively. The heat source 200 and the magnetic assembly 300 do not need to move completely in tandem with each other. The positioning of magnetic assembly 300 need only place the data track addressed by the heat source 200 beneath some active portion of the magnetic assembly 300.

Definition of the data track position by the heat source 200 is described below, after the immediately following discussion of the recording and playback techniques employed by the invention.

To record data, the heat source 200 heats a region 31 of storage layer 30 to an operational temperature in range 440, at the same time that region 31 passes under magnetic assembly 300. By choosing the field strength of the magnetic assembly 300 to be greater than the coercivity 410 of the storage layer in temperature range 440, magnetic assembly 300 may write data to heated region 31 of the storage layer 30 in a conventional manner. However, by choosing the magnetic field strength of the magnetic assembly 300 to be less than any value of the coercivity 410 over temperature range 450 (which includes temperature range 420), stray fields or even a directly applied field from the magnetic assembly 300 cannot alter the magnetic pattern of the remainder of storage layer 30 which may be within temperature range 450. Tracks adjacent to region 31 are therefore not affected by the writing field of magnetic assembly 300, as their temperatures are much lower than that of region 31.

After receiving the written data, region 31 passes beyond the magnetic assembly 300 and cools back to ambient temperature. At ambient operating temperatures, the high coercivity 410 of the storage layer 30 ensures that neither stray magnetic fields or the field from magnetic assembly 300 affect stored data. In this fashion, the width of the written track is defined by the extent of local heating from the heat source 200. In contrast, the recorded feature size along the track is defined by the magnetic assembly characteristics and assembly-medium spacing, as in magnetic recording.

At ambient temperature, the medium magnetization is substantially zero, yielding substantially no playback signal in magnetic assembly 300. To read data, the heat source 200 again heats a region 31 of storage layer 30 to a temperature in range 440 at the same time that region 31 passes under magnetic assembly 300. The magnetization 400 of the region 31 thereby becomes sufficiently high to allow readback of the data recorded in storage layer 30 in a conventional manner by magnetic assembly 300.

In the present invention, reading and writing of data occur at neither the compensation temperature ($T_{comp}$) or Curie Temperature ($T_{cu}$) of the storage layer, but at some value in between (and preferably far away from either of) the two temperatures The preferred $T_{cu}$ in the present invention is in the range of 300 C or more, a much greater value than is preferred for magneto-optic recording materials. This is a major difference between the present invention and magneto-optic or similar optical recording schemes. Furthermore, in RE-TM alloys used in magneto-optic media, data readout by the polar Kerr/Faraday effects requires that the magnetic anisotropy of the storage layer 30 be perpendicular to the plane of the thin film. By contrast, for the materials used in the storage layer 30 of this invention, the anisotropy may be either perpendicular (arrow 60) or parallel (arrow 70 ) to the plane of the thin film.

Although tracks adjacent to region 31 may also contain recorded data, their temperature is much lower than that of region 31, thus their contribution to the readback signal is very small. Once the data is read, the region 31 again passes beyond the magnetic assembly 300 and cools back to ambient temperature. In order to minimize spurious signals from adjacent tracks when reading data, it is important that the adjacent track net magnetization be substantially zero. It is therefore necessary that the ambient temperature be close to the compensation temperature of storage layer 30; in some instances, some means for temperature control of the recording system may be necessary. Definition of the playback feature size is analogous to the case for recording: the track width read by magnetic assembly 300 is again defined by the width of the region locally heated by the heat source 200, while the along-track length-related feature size is again defined by the magnetic assembly characteristics and assembly-medium spacing.

In this manner, data may be written to and read from the storage layer 30 in a data track defined by the width of the region heated by energy source 200, and not by the width of the magnetic assembly 300. The length of the recorded feature, however, is defined by the characteristics of the magnetic assembly and assembly-medium spacing. The use of a magnetic assembly to define the linear transition density during both recording and playback is a novel feature of the present invention, thereby avoiding the limitations (such as diffraction) to the minimum along-track feature dimension (in either recording or playback) inherent in optically read media. Therefore, increased areal density over both conventional magnetic recording and magneto-optic recording is achieved by the present invention.

The use of different techniques to define the along-track and across-track written feature size enables increased areal density recording as well as direct overwriting of previously written data. However, it places some specific requirements upon the recording system which are best illustrated by comparison with conventional magnetic, magneto-optic, and thermomagnetic recording techniques.

Again ignoring demagnetization fields and domain wall energy contributions, conventional magnetic recording occurs when the local applied magnetic field exceeds the medium coercivity. In conventional systems, medium coercivity is substantially constant over an area much larger that the recorded feature size. Recorded feature size and shape are therefore defined by the spatial distribution of the localized magnetic fields produced by the recording head. Thus, the recorded feature boundaries are similar in shape to the profile of the trailing edge of the head gap.

For conventional magneto-optic recording, the situation is reversed. The bias magnetic field is approximately uniform over an area which is orders of magnitude larger than the recorded feature size. The size and shape of the recorded feature are thus defined by the spatial distribution of medium coercivity, which in turn is determined by the local temperature profile produced by the focused laser beam.

Thermomagnetic recording using substantially a conventional MO medium and a magnetic transducer to modulate the applied bias field rapidly is an intermediate case between conventional magnetic recording and magneto-optic recording. In this case the magnetic field is rapidly modulated while the laser continuously heats the moving medium. The resultant written feature shape has curved leading and trailing boundaries, and as the feature size becomes small, the curved boundaries give the feature a cresent shape (see, e.g., U.S. Pat. No. 4,466,004). The medium is optically read and thus limited to substantially the same linear transition densities as conventional optical recording. The cresent shaped features cannot be read suitably by a magnetic transducer having a substantially rectangular sense area or gap. Furthermore, the methods known before the present invention cannot selectively read from an individual track with a wide (relative to the track width) magnetic transducer.

The present invention appears to be a combination of elements of these track definition features, as it uses magnetic assembly geometry for along-track feature definition and medium coercivity distribution to define the across-track feature size. However, as noted above, the read process of the present invention relies upon sensing the remanent magnetic moment of a sub-portion of the heated region with a magnetic assembly having a substantially rectangular sense area; the writing process must therefore produce features suitably shaped for detection by such an assembly. I have found that the feature-defining characteristics of the present invention are strongly dependent upon (1) the relative dimensions of the along-track magnetic field distribution produced by the magnetic assembly, and (2) the distribution of medium coercivity produced by the local heating. Specifically, I have found that the sub-portion of the heated region exposed to appreciable magnetic fields from the magnetic assembly should exhibit substantially constant coercivity along the track direction.

Figure 4:
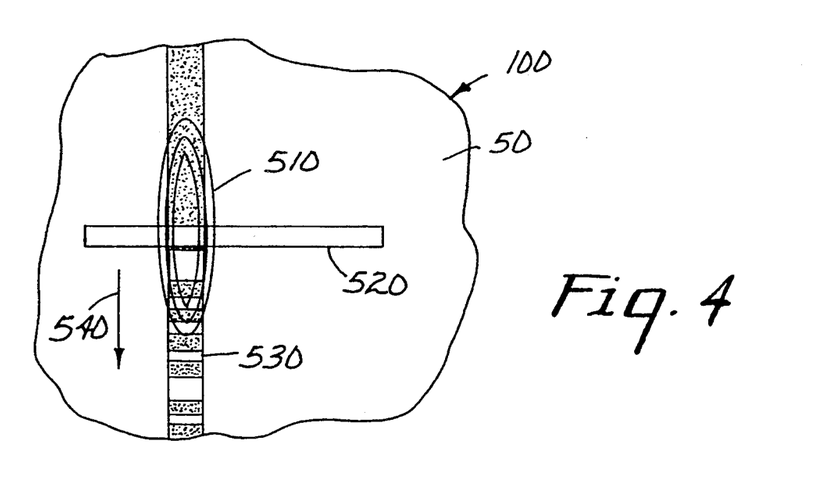
FIG. 4 is a schematic representation of the recording pattern created in the recording layer of FIGS. 1 and 2, taken along the line 4—4 of FIG. 2.

Thus, as shown in FIG. 4, to produce a suitable recorded feature 530, contours of constant coercivity ("isocoercivity contours") 510 resulting from the local heating should have their longest dimension substantially parallel to the track direction (indicated by arrow 540). Equivalently, the isocoercivity contours should have their longest dimension substantially normal to the longest dimension of the projection 520 of the gap of the magnetic assembly from which the applied field emanates. FIG. 4 also illustrates that the track may be offset laterally along the longest direction of the projection 520 and need not be exactly centered.

Several approaches are possible for achieving the desired isocoercivity contours. The specific approach employed depends upon choices made for other system design criteria. Suitable general methods are as follows.

1. Elongation of the thermal profiles along the track direction. As the medium coercivity is dependent upon temperature, it is possible to elongate the isocoercivity contours along the track direction by elongating the isothermal contours of the medium.

A. One method for elongating the isothermal contours along the track direction comprises modification of the characteristics of the localized heat source 200. For example, it is possible to introduce stigmatism into a focused laser beam such that the beam intensity profile is elliptical, with the major axis of the ellipse lying along the track direction. In fact, the intensity profile of solid state lasers, such as those commonly used in MO recording, is typically stigmatic, and significant efforts are necessary to correct the stigmatism to form a (diffraction limited) circular pattern. The use of an elliptically shaped laser beam thus requires a less complicated optical assembly than MO recording, and should improve the thermal profile of a recording area.

B. Production of media with more rapid thermal conduction along the track direction than in the cross-track direction is another method for elongating the isothermal contours along the track direction. One method for producing media with the desired anisotropic thermal conductivity involves specific use of the optical tracking pattern. Conventional optical recording media rely upon substrates having a pattern of shallow grooves in their surface. The optical system used to read and/or write data utilizes the groove pattern for track following, as is well known in the art. The depth of the tracking grooves depends upon the wavelength of the incident illumination; for solid state lasers 750 to 850 nm wavelength, the depth is typically 60 to 100 nm.

Figure 5A:
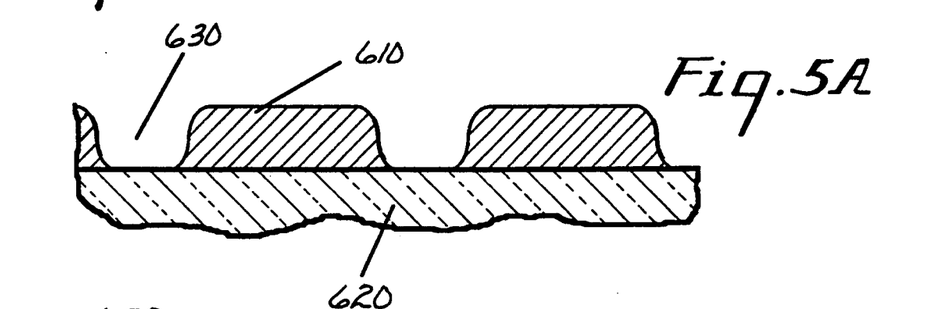
FIG. 5A is a partial cross section, taken perpendicularly to the recording track direction, of a metallized and etched glass substrate used in one embodiment of the invention.

To extend along-track isothermal contours in embodiments of the present invention, a material having higher thermal conductivity than either the substrate or any of the other medium layers could be deposited either between the substrate and the first dielectric layer away from the substrate or between the first dielectric layer and the storage layer. For example, as shown in FIG. 5A, about 70 nm of aluminum, copper, silver, gold or some other material 610 having high thermal conductivity could be deposited on a flat glass substrate 620. The deposited metal film could then be patterned with a photoresist material and etched by a reactive-ion process to remove the metal from the grooves 630. Following removal of the remaining photoresist material, the resulting optical tracking pattern would conduct heat much more rapidly along the track direction than in the across-track direction.

Figure 5B:
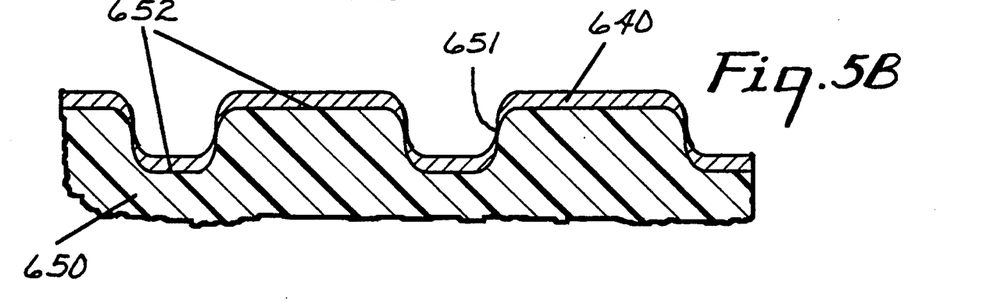
FIG. 5B is a partial cross section, taken perpendicularly to the recording track direction, of a metallized polymeric substrate used in an embodiment of the invention.

An alternative method for fabricating a medium with the desired anisotropic thermal conductivity utilizes a directional deposition source with poor step coverage (e.g., evaporation with a collimated evaporant flux) to deposit a high conductivity material upon a substrate which already contains the optical tracking pattern, such as a grooved polymeric substrate. As shown in FIG. 5B, poor step coverage of the deposited film 640 results in a much thinner film of high conductivity material along the groove walls 651 than on the groove plateaus 652 of the grooved substrate 650. A relative reduction in thermal conductivity in the across-track direction is thereby realized.

2. A second general technique for creating isocoercivity contours comprises constructing a medium in which the recording layer coercivity is substantially invariant with temperature over the range in which writing occurs. FIG. 3 shows that the product of saturation magnetization and coercivity 430 decreases continuously with increasing temperature. For an appreciable fraction of the temperature range 440, however, the saturation magnetization also decreases. By appropriate selection of alloy composition, as well as thin film growth and processing parameters, it is possible to tailor the temperature behavior of both the saturation magnetization-coercivity product and saturation magnetization so as to produce materials with suitable coercivity vs. temperature behavior for use in embodiments of the invention.

The invention could utilize all of the above techniques, i.e., elongation of the thermal profiles along the track direction, by use of both an elliptical energy source and a medium having anisotropic thermal conductivity; and use of a storage layer having coercivity essentially invariant with temperature. The exact mix of techniques employed depends upon design considerations such as the desired minimum space between along-track transitions and the spacing between the media and magnetic assembly.

Prophetic Example 1

A substrate with high along track thermal conductivity is prepared by sputtering 70 nm of $SiN_x$ followed by 70 nm of copper onto a flat glass substrate. The copper layer is patterned using a photoresist and a reactive ion etch process to produce 0.6 micrometer wide grooves with 1.8 micrometer pitch, leaving 1.2 micrometer wide recording tracks. The remaining photoresist is removed, yielding a substrate with the desired anisotropic thermal conductivity. A 100 to 500 nm thick storage layer of TbDyFeCo having a compensation temperature of 30 to 50C., and a Curie temperature of 350 to 450 C., is sputtered on the substrate. Composition and deposition processing are selected to yield a saturation magnetization greater than 100 A/m at 200 C. and a coercivity of between $40 \times 10^3$ and $240 \times 10^3$ A/m at 200 C. A 10 to 100 nm layer of $SiN_x$, $SiC_x$, or carbon is sputtered upon the recording layer. A lubricant layer is subsequently deposited upon the top dielectric layer to complete the medium construction.

The medium could be placed in a drive assembly constructed as generally shown in FIGS. 1 and 2 and described in the accompanying discussion above. The recording system ambient temperature is maintained within 5 C. of the storage layer compensation temperature. The magnetic assembly 300 is of the shielded, inductive-write/magneto-resistive-read head type and flys 100 to 1000 nm above the lubricant layer surface. An optical head assembly comprising a laser beam serves as heat source 200, and is positioned to heat region 31 directly opposite the head. To write data, the laser in the optical head assembly is turned on and heats region 31 to a temperature above 200 C. while simultaneously the head is modulated with the desired digital data stream, producing localized fields at the medium surface greater than the coercivity of heated region 31. Thus, information is recorded onto region 31 as it moves along the data track while the medium moves relative to the laser beam and head.

To readback recorded data, the laser is again energized such that the temperature of region 31 approximately corresponds to the maximum saturation magnetization within the temperature range 440 as shown in FIG. 3. At this temperature, the magnetization of region 31 is much greater than that of any adjacent tracks sensed by the magnetic head, so substantially all of the signal comes from heated region 31, which moves along the data track of interest as the medium moves relative to the optical assembly and magnetic head.

Prophetic Example 2

A $SiN_x$ or $SiC_x$ dielectric layer of 10 to 200 nm thickness is deposited upon a flexible substrate (web) of 10 to 100 micrometers thickness. The configuration of the substrate may be flexible disk or tape, depending on the desired application. The substrate may comprise polyethylene terapthalate, polyimide, or other flexible recording media substrates known in the art. A 50 to 500 nm thick storage layer of TbDyFeCo having a compensation temperature of 30 to 50 C., and a Curie temperature of 350 to 450 C., is sputtered on the substrate. Composition and deposition processing are selected to yield a saturation magnetization greater than 100 amps per meter (A/m) at 200 C. and a coercivity of between $40 \times 10^3$ and $240 \times 10^3$ A/m at 200 C.. A 5 to 50 nm layer of $SiN_x$, $SiC_x$, or carbon is sputtered upon the recording layer. A 1 to 10 nm lubricant layer is subsequently deposited upon the top dielectric layer to complete the medium construction.

The medium could be placed in a flexible disk or tape drive assembly constructed as generally shown in FIGS. 1 and 2 and described in the accompanying discussion above. The recording system ambient temperature is maintained within 5 C. of the recording layer compensation temperature. The magnetic assembly 300 is of the shielded, inductive-write/magnetoresistive-read head type and is substantially in contact with the lubricant layer surface. An optical head assembly comprising a laser beam serves as heat source 200, and is positioned to heat region 31 directly opposite the head.

In this embodiment of the invention, the gap of the magnetic assembly 300 can be small relative to the size of the heated spot; thus, the criterion of maintaining the medium isocoercivity contours substantially normal to the gap can be satisfied without resorting to structural methods for creating anisotropic thermal conductivity.

To write data, the laser in the optical head assembly 200 is turned on and heats region 31 to a temperature above 200 C. while simultaneously the magnetic assembly is modulated with the desired digital data stream, producing localized fields at the medium surface greater than the coercivity of heated region 31. Thus, information is recorded onto region 31 as it moves along the data track while the medium moves relative to the laser beam and head.

To readback recorded data, the laser is again energized such that the temperature of region 31 approximately corresponds to the maximum saturation magnetization within the temperature range 440 as shown in FIG. 3. At this temperature, the magnetization of region 31 is much greater than that of any adjacent tracks sensed by the magnetic head, so substantially all of the signal comes from heated region 31, which moves along the data track of interest as the medium moves relative to the optical assembly and magnetic head.

I claim:

1. A thermomagnetic recording medium for use with a heat source which raises temperature of a heated region of the medium from an ambient temperature to an operating temperature, a magnetic field source which imposes a magnetic field upon an area of the medium including a portion of the heated region, and a magnetic field detector which senses remanent magnetic moment of the medium over a substantially rectangular sensing region having longest dimension perpendicular to the direction of a data track on the medium, the medium comprising:
a substrate;
a barrier layer deposited on the substrate;
a magnetizable recording layer deposited on the barrier layer, wherein the recording layer has a net magnetic moment and coercivity dependent upon temperature, such that the net magnetic moment is substantially zero at the ambient temperature and substantially different from zero at the operating temperature, the coercivity decreases with temperature to zero at a Curie temperature which is substantially above the operating temperature, and the portion of the heated region which is exposed to the imposed magnetic field exhibits substantially constant coercivity along the track direction; and
a protective layer deposited on the recording layer.

2. The medium of claim 1, wherein the recording layer comprises an alloy of at least one rare earth element and at least one transition metal.

3. The medium of claim 2, wherein the rare earth element of the recording layer comprises at least one of terbium, gadolinium, and dysprosium.

4. The medium of claim 2, wherein the transition metal of the recording layer comprises at least one of cobalt, iron, manganese, and nickel.

5. The medium of claim 2, wherein the recording layer comprises terbium, dysprosium, iron, and cobalt.

6. The thermomagnetic recording medium of claim 5, wherein the recording layer comprises terbium, dysprosium, iron, and cobalt in proportions given by $Tb_wDy_xFe_yCo_z$, wherein $0<w<25$, $0<x<25$, $0<y<50$, $10<z<70$, and $w+x+y+z=0100$.

7. The medium of claim 2, wherein the recording layer further comprises at least one element chosen from the group consisting of chromium, yttrium and tantalum.

8. The thermomagnetic recording medium of claim 1, wherein the recording layer comprises a plurality of compositionally distinct sublayers magnetically coupled to one another by exchange interactions.

9. The thermomagnetic recording medium of claim 8, wherein at least one sublayer comprises an alloy chosen from the group consisting of (a) at least one rare earth element, (b) at least one transition metal, and (c) an alloy comprising at least one rare earth element and at least one transition metal.

10. The medium of claim 1, wherein the recording layer exhibits perpendicular magnetization.

11. The medium of claim 1, wherein the recording layer exhibits parallel magnetization.

12. The medium of claim 1, wherein the recording layer exhibits anisotropic thermal conductivity parallel to the plane of the recording layer.

13. The medium of claim 12, wherein the substrate comprises grooved tracks having a thermally conductive material deposited in the tracks.

14. The medium of claim 1, further comprising a lubricant layer deposited on the barrier layer.

15. The medium of claim 1, wherein the substrate is flexible.

16. A thermomagnetic recording system, comprising:
a thermomagnetic recording medium having data tracks provided thereon;
a heat source which raises temperature of a heated region of the medium from an ambient temperature to an operating temperature; and
a magnetic assembly comprising a magnetic field source, which imposes a magnetic field upon an area of the medium including a portion of the heated region, and a magnetic field detector which senses a remanent magnetic moment of the medium over a substantially rectangular sensing region having longest dimension normal to the length of data tracks on the medium;
wherein the medium comprises:
a substrate;
a barrier layer deposited on the substrate;
a magnetizable recording layer deposited on the barrier layer, wherein the recording layer has a net magnetic moment and coercivity dependent upon temperature, such that the net magnetic moment is substantially zero at the ambient temperature and substantially different from zero in the heated region which is at an operating temperature, the coercivity decreases with temperature to zero at a Curie temperature which is substantially above the operating temperature, and the portion of the heated region which is exposed to the imposed magnetic field exhibits substantially constant coercivity along the length of the tracks; and
a protective layer deposited on the recording layer.

17. The system of claim 16, wherein the heat source is a laser.

18. The system of claim 17, wherein the heat source and the magnetic assembly are on a same side with respect to a surface of the thermomagnetic recording medium.

19. The system of claim 17, wherein the magnetic field source comprises a magnetic transducer, having a gap, and a waveguide which directs laser light to the thermomagnetic recording medium through the gap.

20. The system of claim 19, wherein the waveguide comprises a fiber optic assembly.

21. The system of claim 17, wherein the laser is a laser diode incorporated into the magnetic assembly.

22. The system of claim 16, wherein the magnetic field detector comprises a magnetic transducer sensitive to magnetization of the thermomagnetic recording medium which has a direction normal to the plane of the medium.

23. The system of claim 16, wherein the magnetic field detector comprises a magnetic transducer sensitive to magnetization of the thermomagnetic recording medium which has a direction parallel to the plane of the medium.

24. The system of claim 16, wherein the magnetic field detector comprises a first magnetic transducer for detecting remanent magnetic properties of the magnetic recording medium and a magnetic field source comprising a second magnetic transducer for changing remanent magnetic properties of the magnetic recording medium.

* * * * *